(12) United States Patent
Morgan et al.

(10) Patent No.: US 9,476,361 B2
(45) Date of Patent: Oct. 25, 2016

(54) SYSTEMS AND METHODS FOR CONTROL OF OPERATING LIFE OF A GAS TURBINE

(71) Applicant: General Electric Company, Schenectady, NY (US)

(72) Inventors: Rex Allen Morgan, Greenville, SC (US); Lewis Berkley Davis, Jr., Niskayuna, NY (US); Harold Lamar Jordan, Greenville, SC (US); Scott Richard Baker, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 571 days.

(21) Appl. No.: 13/937,078

(22) Filed: Jul. 8, 2013

(65) Prior Publication Data
US 2015/0007574 A1     Jan. 8, 2015

(51) Int. Cl.
*F02C 9/00* (2006.01)
*F02C 9/28* (2006.01)

(52) U.S. Cl.
CPC . *F02C 9/00* (2013.01); *F02C 9/28* (2013.01); F05D 2260/80 (2013.01); F05D 2260/821 (2013.01); F05D 2270/11 (2013.01)

(58) Field of Classification Search
CPC ........ F02C 9/00; F02C 9/28; F05D 2260/80; F05D 2260/821; F05D 2270/11
See application file for complete search history.

(56) References Cited

U.S. PATENT DOCUMENTS

| | | | | |
|---|---|---|---|---|
| 5,410,883 A * | 5/1995 | Nigawara | ............... | G05B 9/02 60/646 |
| 5,447,059 A * | 9/1995 | Miller | ............... | G07C 3/00 73/112.03 |
| 6,539,783 B1 * | 4/2003 | Adibhatla | ............... | F02C 9/00 73/112.06 |
| 6,823,675 B2 * | 11/2004 | Brunell | ............... | F02C 9/00 60/773 |
| 6,871,160 B2 * | 3/2005 | Jaw | ............... | G01M 15/00 700/108 |
| 7,188,019 B2 * | 3/2007 | Nomura | ............... | F02C 9/28 60/39.281 |
| 7,197,430 B2 * | 3/2007 | Jacques | ............... | F02C 9/00 701/100 |
| 7,203,554 B2 * | 4/2007 | Fuller | ............... | G05B 13/048 700/121 |
| 7,840,332 B2 * | 11/2010 | Saravanapriyan | ...... | F01K 13/02 701/100 |
| 7,853,392 B2 * | 12/2010 | Healey | ............... | F02C 9/00 701/100 |
| 8,090,545 B2 * | 1/2012 | Gobrecht | ............... | F01K 13/00 60/39.13 |
| 2008/0140352 A1 * | 6/2008 | Goebel | ............... | G05B 19/4184 702/183 |
| 2009/0048730 A1 * | 2/2009 | Akkaram | ............... | G07C 5/006 701/31.4 |
| 2014/0156165 A1 * | 6/2014 | Ewens | ............... | F02C 9/28 701/100 |
| 2015/0234951 A1 * | 8/2015 | Andersson | ............... | G06F 17/18 703/2 |

OTHER PUBLICATIONS

U.S. Appl. No. 13/801,259, filed Mar. 3, 2013, Lewis Berkley Davis, Jr., et al.

* cited by examiner

*Primary Examiner* — Carlos A Rivera
(74) *Attorney, Agent, or Firm* — Fletcher Yoder, P.C.

(57) ABSTRACT

A system includes a gas turbine system including a compressor, a combustor, and a turbine. The system also includes a controller communicatively coupled to the gas turbine system and configured to control operations of the gas turbine system. The system further includes a life consumption model configured to determine an operating life of the gas turbine system based on both a health status of one or more components of the gas turbine system and operating conditions of the gas turbine system. The controller is configured to utilize at least the life consumption model to derive a control action for the gas turbine system.

15 Claims, 3 Drawing Sheets

SYSTEMS AND METHODS FOR CONTROL OF OPERATING LIFE OF A GAS TURBINE

BACKGROUND

The subject matter disclosed herein relates to gas turbine engines, and more particularly, to systems and methods for controlling the gas turbine engines.

In general, performance of gas turbine systems may degrade over time. Certain systems, such as an industrial control system, may provide for capabilities that enable the control and analysis of the gas turbine system. For example, the industrial control system may include controllers, field devices, and sensors storing data used in controlling the turbine system. Certain industrial control systems may use modeling for enhancing the industrial control system. It would be beneficial to improve the modeling to take into account degradation of gas turbine performance to maintain and/or maximize the gas turbine performance.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first embodiment, a system includes a gas turbine system including a compressor, a combustor, and a turbine. The system also includes a controller communicatively coupled to the gas turbine system and configured to control operations of the gas turbine system. The system further includes a life consumption model configured to determine an operating life of the gas turbine system based on both a health status of one or more components of the gas turbine system and operating conditions of the gas turbine system. The controller is configured to utilize at least the life consumption model to derive a control action for the gas turbine system.

In accordance with a second embodiment, a method includes receiving at least one turbine operating condition of a gas turbine system and receiving a health status of at least one component of the gas turbine system. The method also includes modeling an operating life of the gas turbine system based on the at least one turbine operating condition and the health status of the at least one component. The method further includes outputting a control action based on at least the operating life of the gas turbine system for controlling the gas turbine system.

In accordance with a third embodiment, a non-transitory computer-readable medium having computer executable code stored thereon is provided. The code includes instructions for receiving at least one turbine operating condition of a gas turbine system and receiving a health status of at least one component of the gas turbine system. The instructions also include modeling an operating life of the gas turbine system based on the at least one turbine operating condition and the health status of the at least one component. The instructions further include outputting a control action based on at least the operating life of the gas turbine system for controlling the gas turbine system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
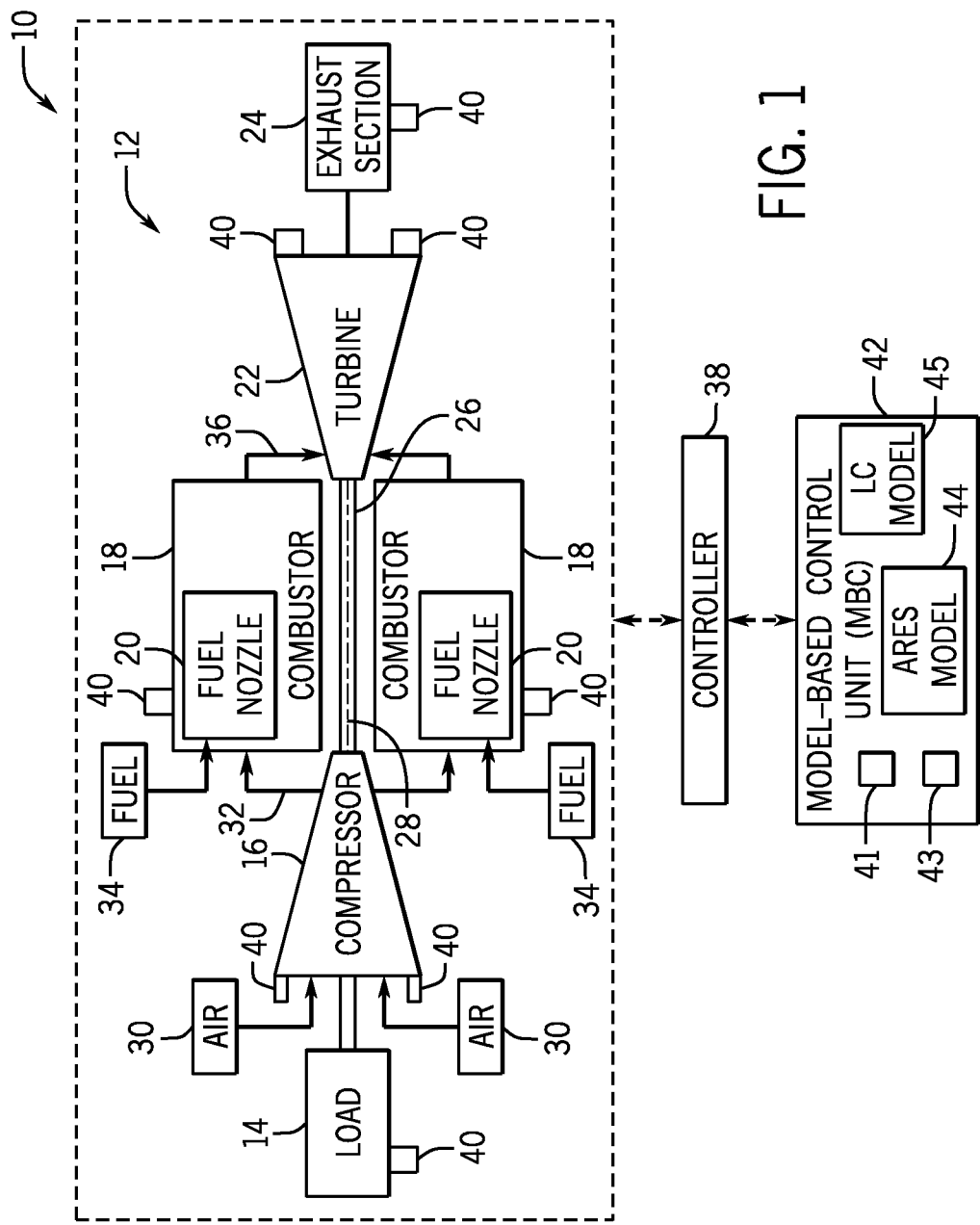
FIG. 1 is a block diagram of a turbine system having a model-based control (MBC) unit utilizing an Adaptive Real-time Engine Simulator (ARES) model and a life consumption (LC) model, in accordance aspects of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The presently disclosed system enables the creation of a model (e.g., life consumption (LC) model) to determine an operating life of a gas turbine system (i.e., how long the gas turbine system will operate before needing replacement) and to use this model in controlling the operation of the gas turbine system. For example, a controller that controls operation of the gas turbine system is communicatively coupled to the gas turbine system. The controller is configured to utilize at least the LC model to derive a control action for the gas turbine system (e.g., control an actuator coupled to the gas turbine system). The controller may also utilize performance-targeted operating conditions, combustion boundary models, operational limits (e.g., emissions limits, compressor surge protection limits, etc.) and/or performance health of one or more components of the gas turbine system. The LC model, utilized by the controller, determines the operating life of the gas turbine system based on a health status of one more components of the gas turbine system and/or operating conditions (e.g., actual operating conditions and/or statistically derived estimates of the most likely operating conditions) of the gas turbine system. The LC model may calculate an actual life consumption rate (i.e., actual rate of consuming the operating life the gas turbine system) for the gas turbine system. Also, the LC model may utilize both the actual life consumption rate and a life consumption target rate (i.e., target rate for consuming the operating life the gas turbine system) for the gas turbine system to determine the operating life. Further, the LC model may adjust the life consumption target rate based on the actual life consumption rate. In certain embodiments, the life consumption rate may be utilized by the controller to adjust one or more of the performance-targeted operating conditions of the gas turbine system. The LC model may be used in establishing an improved load operating condition for the gas turbine system based at least partially on the operating life of the gas turbine system. The LC model may facilitate reducing the variation from machine-to-machine in settings with multiple gas turbine engines.

With the forgoing in mind, FIG. 1 is a block diagram of an embodiment of a turbine system 10 (e.g., gas turbine system) that may use the presently disclosed techniques for determining an operating life of the turbine system 10 and using the operating life in controlling the performance of the turbine system 10. The illustrated turbine system 10 includes a gas turbine engine 12 coupled to a load 14, such as an electrical generator. The gas turbine engine 12 includes a compressor 16, a plurality of combustors 18 each having at least one fuel nozzle 20, a turbine 22, and an exhaust section 24. As illustrated, one or more shafts 26 connect the load 14, compressor 16, and turbine 22. The compressor 16 and the turbine 22 each include a rotor with blades, which rotate within a stator or shroud. In operation, the compressor 16 receives air 30 and delivers compressed air 32 to the combustors 18 and/or fuel nozzles 20, which then inject fuel 34 (or an air-fuel mixture) into a combustion region in the combustors 18. In turn, the air-fuel mixture combusts in the combustors 18 to produce hot combustion gases 36, which drive blades within the turbine 18. As the turbine 18 is driven to rotate the shaft 26, the compressor 16 is driven to compress the air 16 into the combustors 18 and/or fuel nozzles 20.

Additionally, the illustrated turbine system 10 includes a controller 38 that may generally control the operations of the turbine system 10. For example, in certain embodiments, the controller 38 may be coupled to a number of sensors 40 (e.g., temperature sensors, pressure sensors, clearance sensors, flow rate sensors, vibration sensors, flame sensors, or other suitable sensors) disposed throughout the gas turbine engine 12. The controller 38 may communicate (e.g., via a network or bus) with the sensors 40 to receive information regarding the turbine engine 12. For example, the controller 38 may communicate with a temperature sensor 40 coupled to the exhaust section 24 of the gas turbine engine 12 to receive a temperature of the exhaust gases. By further example, a flow sensor 40 coupled to the fuel nozzle 20 of the gas turbine engine 12 may communicate to the controller 38 the rate at which a liquid fuel is being supplied to the fuel nozzle 20. Furthermore, in certain embodiments, the controller 38 may also communicate with certain components of the turbine system (e.g., the compressor 16, the combustor 18, the turbine 22, intake vanes (e.g., inlet guide vanes (IGVs)), valves, pumps, actuators, or other suitable components) to control or alter the operation of the gas turbine engine 12. For example, the controller 38 may communicate with the compressor 16 of the gas turbine engine 12 to instruct the field device to open or close an air intake to allow more or less air 30 into the compressor 16. Additionally, the controller 38 may communicate with a fuel actuator on the gas turbine engine 12 to selectively regulate fuel flow, fuel splits, and/or a type of fuel channeled between the fuel supply 34 and the combustors 18. Further, the controller 38 may communicate with additional actuators to adjust a relative position of the IGVs, adjust inlet bleed heat, or activate other control settings on the gas turbine engine 12.

In addition, operations executed by the controller 38 include sensing or modeling operating parameters, modeling operating life of the system 10, modeling operational boundaries, applying operational boundary models, or applying scheduling algorithms that control operation of the gas turbine engine 12 (e.g., based operational limits, performance-targeted operating conditions, operating life of the system 10, etc.), such as regulating a fuel flow to the combustor 18. Controller 38 utilizes the operational limits, the performance-targeted operating conditions, combustion boundary models, and/or the operating life of the system 10 to generate control outputs such as those described above.

Furthermore, the illustrated turbine system 10 includes a model-based control (MBC) unit 42. The MBC unit 42 may include non-transitory code or instructions stored in a machine-readable medium (e.g., memory 41) and used by a processor (e.g., processor 43) to implement the techniques disclosed herein. In general, the MBC unit 42 may utilize one or more models (e.g., the Adaptive Real-time Engine Simulator (ARES) model 44 and/or the life consumption (LC) model 45, which may be stored in memory 41) to simulate the operation of a system (e.g., the turbine system 10) and/or an operating life of the system. Based on the output of the models (e.g., the ARES model 44 and/or the LC model 45), the MBC unit 42 may determine a number of parameters of the gas turbine engine 12 that may be recommended for a change (e.g., to improve or modify the performance of the turbine system 10). In certain embodiments, the MBC unit 42 may be communicatively coupled to the controller 38 to receive information regarding the operation of the turbine system 10 (e.g., via sensors 40). For such embodiments, the MBC unit 42 may additionally provide the controller 38 with instructions regarding one or more parameters of the gas turbine engine 12 that be recommended for a change, based on the output of the model (e.g., the ARES model 44 and/or the LC Model 45), to modify the operation of the gas turbine system 10. In other embodiments, the MBC unit 42 may be part of the controller 38 (e.g., as hardware, software, or a combination thereof) or may serve as the controller 38, allowing the MBC unit 42 to directly communicate with the sensors 40 and/or the components (e.g., the compressor 16, combustors 18, turbine 22, or other suitable components) of the turbine system 10 to receive information and to control the operation of the turbine system 10.

For the turbine system 10 illustrated in FIG. 1, the ARES model 44 may simulate the operation of a model turbine system (e.g., modeled after the turbine system 10). For example, the ARES model 44 may receive inputs regarding the operation of the gas turbine engine 12, either directly from the sensors 40 (e.g., via a network) or indirectly from another source (e.g., via the controller 38 or supplied by an operator). By specific example, the ARES model 44 may receive inputs from sensors 40, including a temperature for the exhaust section 24, a flow rate for the fuel 34 entering the fuel nozzle 20 of the combustor 18, a flow rate for the air 30 entering the compressor 16, the ambient conditions near the turbine system 10, rotational speed of the turbine 22, clearance between turbine and/or compressor blades and the surrounding shroud, exhaust emissions, vibration, combustion dynamics, and so forth. Furthermore, in certain embodiments, the ARES model 44 may receive inputs regarding the turbine system 10 from an operator or user. For example, in certain embodiments, an operator may provide the MBC unit 42 with other inputs regarding the turbine system 10, such as information that may not be gleaned by the sensors 40.

For the turbine system 10 illustrated in FIG. 1, the LC model 45 may determine the operating life of the system 10

(e.g., gas turbine engine 12). For example, the LC model 45 may receive inputs regarding operation of the gas turbine engine 12, either directly from the sensors 40 (e.g., via a network) or indirectly from another source (e.g., via the controller 38 or supplied by an operator). These inputs may include a health status of one or more components of the gas turbine system 10 (e.g., compressor 16, combustor 18, turbine 22, exhaust section 24, etc.). In addition, the inputs may include actual operating conditions. Also, the inputs may include statistically derived estimates of the most likely operating conditions. The operating conditions may relate to power (e.g., load power) of the gas turbine engine 12, flow, pressure, temperature, and/or specific humidity at the compressor inlet, pressure and/or temperature at the compressor exit, pressure and/or temperature at the turbine exit, levels of emissions (e.g., $NO_x$, CO, etc.), vibration amplitude, vibration frequency, clearance, possible rub conditions, and other operating conditions. Other operating conditions may include flame temperature, combustion dynamics, temperature of the metal parts (e.g., turbine casing, combustors, etc.). The input may be used by the LC model 45 to calculate an actual life consumption rate for the system 10. In certain embodiments, the LC model 45 may be provided a life consumption target rate based on a number of hours of life for the system 10. The LC model 45 utilizes both the life consumption target rate and the actual life consumption rate to determine the operating life of the gas turbine system 10. In certain embodiments, the LC model 45 may adjust the life consumption target rate based on the actual life consumption rate. For example, if the system 10 is consuming life too fast, the LC model 45 may adjust (e.g., decrease) the life consumption target rate. As described in greater detail below, the controller 38 utilizes the LC model 45 (e.g., the operating life) to derive a control action for the gas turbine system 10 (e.g., control actuators) to establish an improved load operating condition for the gas turbine system 10.

Figure 2:
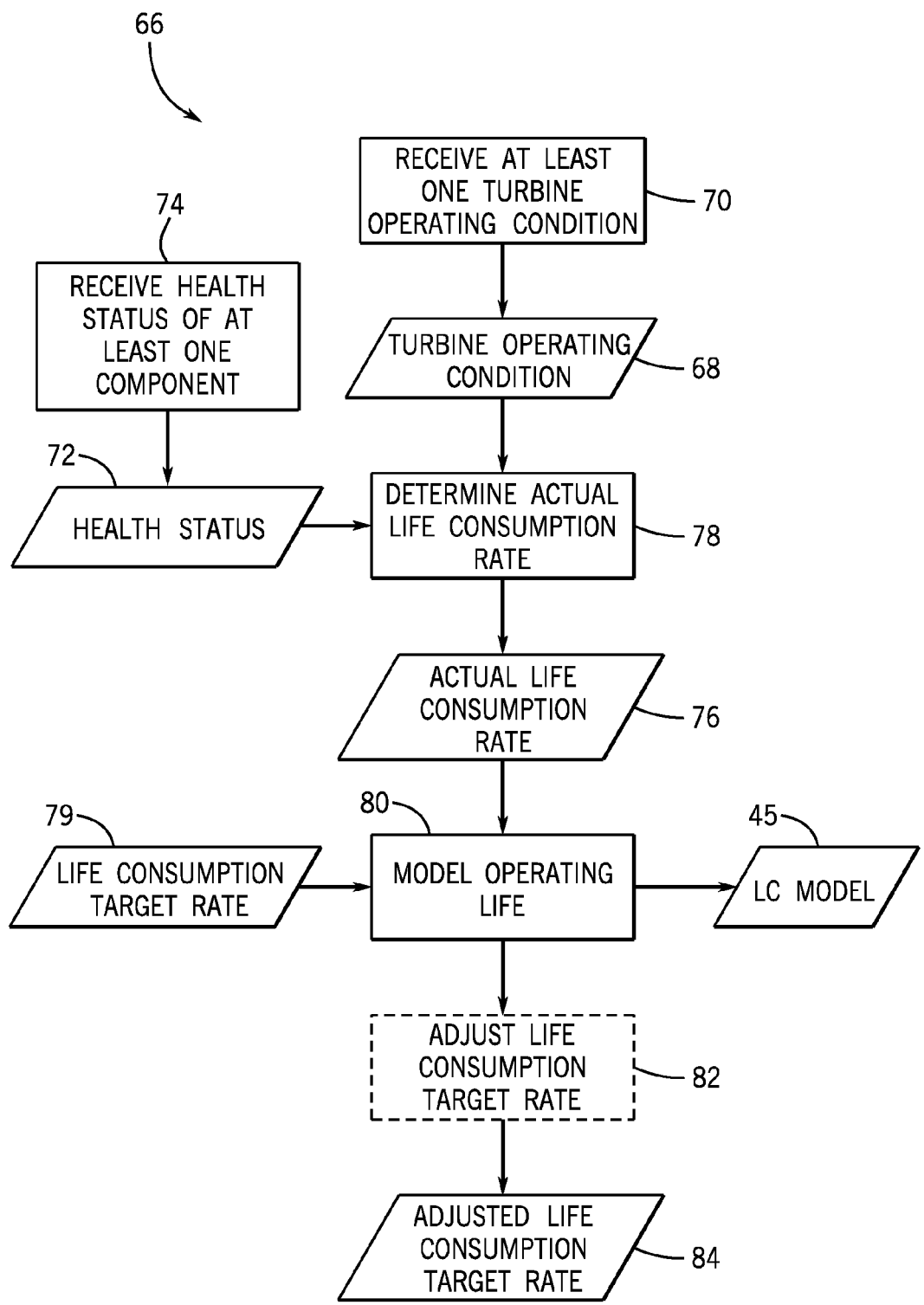
FIG. 2 is a flow chart of an embodiment of a process for generating the LC model for the turbine system of FIGS. 1.

FIG. 2 is a flow chart of an embodiment of a process 66 for generating a life consumption model 45 for the turbine system 10 of FIG. 1. The process 66 may be implemented as executable code instructions stored on a non-transitory tangible computer-readable medium, such as memory 41 described above. The process 66 includes receiving (e.g., at processor 43) one or more turbine operating conditions 68 for the gas turbine system 10 (block 70). The operating conditions 68 may be actual operating conditions and/or statistically derived estimates of the most likely operating conditions as described above. For example, some of the operating conditions 68 may include operating parameters such as power (e.g., load power) of the gas turbine engine 12, flow, pressure, temperature, and/or specific humidity at the compressor inlet, pressure and/or temperature at the compressor exit, pressure and/or temperature at the turbine exit, levels of emissions (e.g., $NO_x$, CO, etc.), and other operating conditions. In certain embodiments, the operating conditions 68 may include cycle information related to operating parameters such as firing temperature and/or exhaust temperature. The process 66 also includes receiving (e.g., at processor 43) a health status 72 (e.g., operating condition, physical condition, etc.) of one or more components (e.g., compressor 16, compressor blades and/or vanes, combustor 18, fuel nozzle 20, turbine 22, turbine blades and/or vanes, exhaust section 24, etc.) of the turbine system 10 (block 74). Based on the health status 72 of one or more components of the system and the one or more operating conditions 68, the process 66 includes determining (e.g., via processor 43) an actual life consumption rate 76 (e.g., degradation rate of the system 10 and/or components of the system 10). The process 66 includes utilizing both the actual life consumption rate 76 and a life consumption target rate 79 based on a number of hours of life for the system 10 to model the operating life of the system 10 (block 80) to generate the LC model 45. In certain embodiments, the process 66 includes adjusting (e.g., via the processor 43) the life consumption target rate 79 based on the actual life consumption rate 76 (block 82) to generate an adjusted life consumption target rate 84. For example, if the system 10 is consuming life too fast, the LC model 45 may adjust (e.g., decrease) the life consumption target rate 79. However, if the life of the system 10 is proceeding as expected, the life consumption target rate 79 may not be adjusted. As mentioned above, the LC model 45 (e.g., operating life of the system 10) is utilized (e.g., via the MBC Unit 42 and/or controller 38) to derive a control action for the gas turbine system 10 (e.g., control actuators) to establish an improved load operating condition for the gas turbine system 10. This allows an integrated control strategy that combines performance of the system 10 and hot gas path life consumption objectives to be utilized in an active and adaptive fashion in an overall control strategy for the system 10. This integrated control strategy maintains performance of the system 10 as the gas turbine performance degrades from use.

Figure 3:
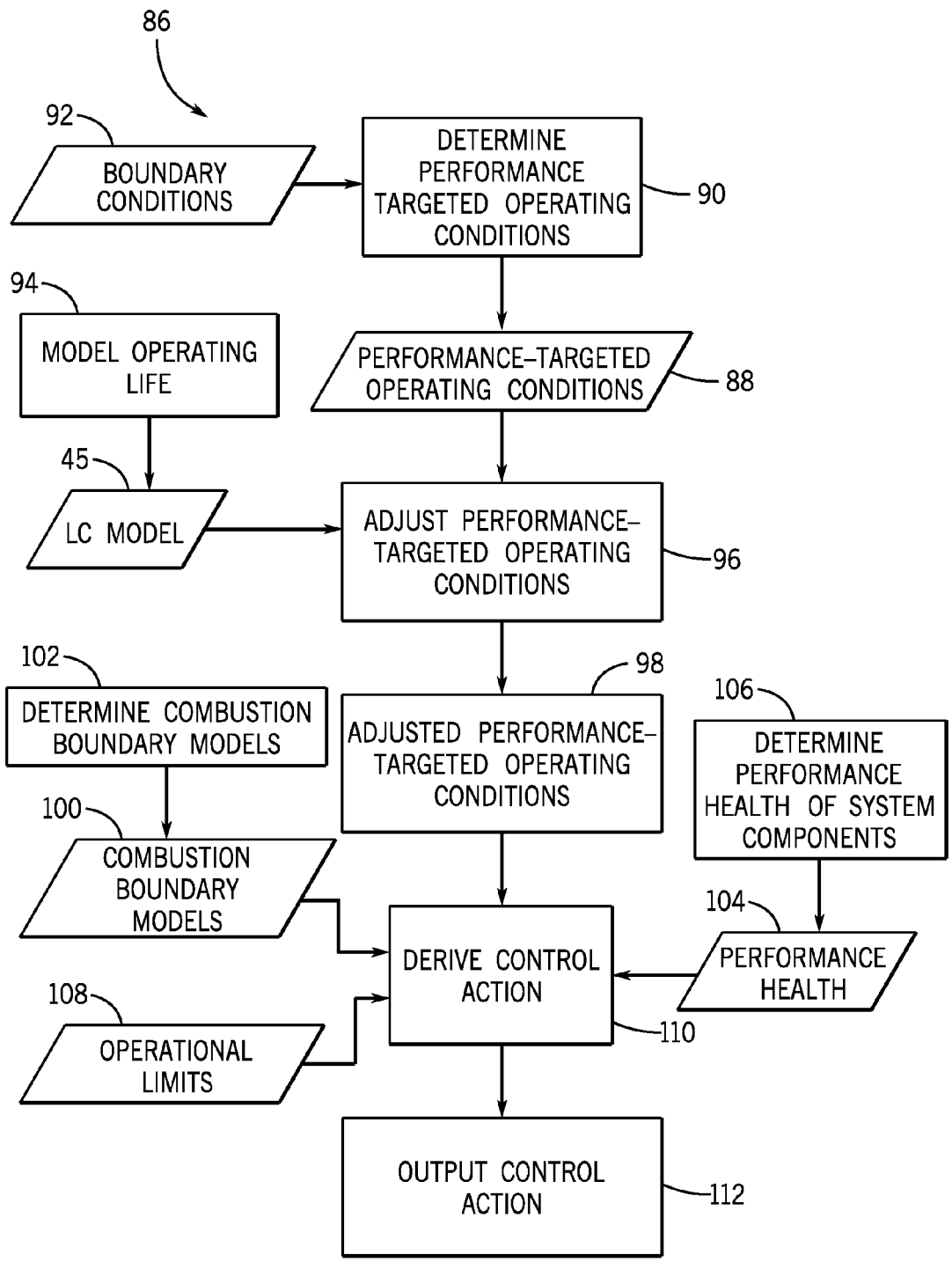
FIG. 3 is a flow chart of an embodiment of a process for utilizing the LC model generated in FIG. 2 in control of the turbine system of FIG. 1.

FIG. 3 is a flow chart of an embodiment of a process 86 for utilizing the LC model 45 generated in FIG. 2 in control of the turbine system 10 of FIG. 1. The process 86 may be implemented as executable code instructions stored on a non-transitory tangible computer-readable medium, such as memory 41 described above. The process 86 includes determining (e.g., via a performance target algorithm utilizing processor 43) one or more performed-targeted operating conditions 88 or design operating conditions (block 90). The operating conditions 88 (i.e., expected conditions given specific parameters) may include but are not limited to an expected power capability of the system 10 over an ambient operating range. The performance-targeted operating conditions 88 may be determined via schedules programmed into the controller 38 or via a model built into the controller 38. Upper limits of boundary conditions 92 are used as input in determining the performance-targeted operating conditions 88. These boundary conditions 92 represent nominal or design operating parameters (e.g., temperatures, pressures, gas flows, etc.) for the turbine system 10. Operational boundary models may be defined by one or more physical boundaries of the turbine system 10 and the upper limits of the boundary conditions 92 represent desired conditions for the turbine system 10 at each boundary.

The process 86 also includes modeling (e.g., via processor 43) the operating life of the system 10 (block 94) to generate the LC model 45 as described above in process 66 of FIG. 2. The process 86 further includes adjusting one or more of the performance-targeted operating conditions 88 (e.g., power request) based on the operating life of the system 10 from the LC model 45 (block 98) to generate one or more adjusted performance-targeted operating conditions 98.

In addition, the process 86 includes determining combustion boundary models 100 (e.g., for emissions such as $NO_x$ and CO and/or combustion dynamics) (block 102). The combustion boundary models 100 may be determined via the ARES model 44 of the MBC unit 42. Also, the process 86 includes determining performance health 104 for one or more components (e.g., compressor 16, compressor blades and/or vanes, combustor 18, fuel nozzle 20, turbine 22, turbine blades and/or vanes, exhaust section 24, etc.) of the system 10 (block 106). The performance health 104 represents a current performance health state of the one or more components relative to a performance health state of the same one or more components when they were new. For example, the performance health 104 may be represented as a ratio of the current performance health to the performance health state when new (i.e., a baseline or new health state). Thus, a ratio of less than 1 for the performance health 104 would represent a loss or decrease in performance of the one or more components. A ratio of 1:1 for the performance health 104 indicates the component has not decreased in performance.

Further, the process 86 (e.g., via a scheduling algorithm utilizing processor 43) may utilize operational limits 108 or constraints, the operating life of the system from the LC model 45, the combustion boundary models 102, and/or the performance health 104 of one or more components to derive a control action (block 110) for the gas turbine system 10. Operational limits 108 may include compressor surge protection limits, turbine exit Mach number limits, flow limits, emissions limits, flame temperature limits, combustion dynamics limits, plant level limits based on output or exhaust conditions, or other limits. The process 86 also includes outputting the control action for the turbine system 10 (block 112). Control actions may include controlling actuators (e.g., fuel valve actuator) of the turbine system 10 to selectively regulate fuel flow, fuel splits, and/or a type of fuel channeled between the fuel supply 34 and combustors 18. Control actions may also include controlling actuators to adjust a relative position of IGVs, adjust inlet bleed heat, or activate other control settings of the turbine system 10. In certain embodiments, control actions include modifying target operating requests for the turbine system 10. Modifying target operating requests may include selecting between effector (e.g., actuator) position requests that correspond to targets and limits for operating the turbine system 10. Alternatively, modifying target operating requests may include modifying a target (e.g., power to a target level) to satisfy a particular limit. Modifying a target to satisfy a particular limit may utilize on board computer-based models of the turbine system 10 to provide an estimation of the modified target based on knowledge of the machine health and associated boundary conditions. The LC model 45 (e.g., operating life of the system 10) is utilized (e.g., via the MBC Unit 42 and/or controller 38) along with the other factors described above to derive the control action for the gas turbine system 10 (e.g., control actuators) to establish an improved load operating condition for the gas turbine system 10. This allows an integrated control strategy that combines performance of the system 10 and hot gas path life consumption objectives to be utilized in an active and adaptive fashion in an overall control strategy for the system 10. This integrated control strategy maintains performance of the system 10 as the gas turbine performance degrades from use. The LC model 45 may facilitate reducing the variation from machine-to-machine in settings with multiple gas turbine engines 12.

Technical effects of the disclosed embodiments include providing techniques for determining an operating life of the turbine system 10 and using the operating life along with other factors in controlling the performance of the turbine system 10. Disclosed embodiments enable the creation of a model (e.g., LC model 45) to determine the operating life of the turbine system 10 and to use this model 45 in controlling the operation of the gas turbine system 10. The LC model 45 may be used in establishing an improved load operating condition for the turbine system 10 based at least partially on the operating life of the turbine system 10. The LC model 45 may facilitate reducing the variation from machine-to-machine in settings with multiple gas turbine engines 12. The disclosed embodiments allow an integrated control strategy that combines performance of the system 10 and hot gas path life consumption objectives to be utilized in an active and adaptive fashion in an overall control strategy for the system 10. This integrated control strategy maintains performance of the system 10 as the gas turbine performance degrades from use.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gas turbine system comprising a compressor, combustor, and a turbine;
a controller communicatively coupled to the gas turbine system and configured to control operations of the gas turbine system; and
a life consumption model configured, during the gas turbine system operating under a load operating condition, to determine an operating life of the gas turbine system based on both a health status of one or more components of the gas turbine system and operating conditions of the gas turbine system, wherein the controller, during the gas turbine system operating under the load operating condition, is configured to utilize at least the life consumption model to derive and output a control action for the gas turbine system, and the operating conditions comprise actual operating conditions or statistically derived estimates of most likely operating conditions during the load operating condition;
wherein the life consumption model is configured, during the gas turbine system operating under the load operating condition, to calculate an actual life consumption rate for the gas turbine system based on both the health status of the one or more components of the gas turbine system and the operating conditions of the gas turbine system.

2. The system of claim 1, wherein the life consumption model is configured to utilize both a life consumption target rate for the gas turbine system and the actual life consumption rate to determine the operating life of the gas turbine system.

3. The system of claim 2, wherein the life consumption model is configured to adjust the life consumption target rate based on the actual life consumption rate.

4. The system of claim 1, wherein the controller is configured to utilize the life consumption model to adjust at least one performance-targeted operating condition for the gas turbine system.

5. The system of claim 4, wherein the controller is configured to utilize one or more combustion boundary models for the gas turbine system to derive the control action for the gas turbine system.

6. The system of claim 4, wherein the controller is configured to utilize the at least one adjusted performance-targeted operating condition and operational limits for the gas turbine system to derive the control action for the gas turbine system.

7. The system of claim 1, wherein the controller is configured to utilize a performance health of one or more components of the gas turbine system to derive the control action for the gas turbine system, and wherein the performance health represents a current performance health state of the one or more components relative to a performance health state of the one or more components when the one or more components were new.

8. The system of claim 1, comprising an actuator coupled to the gas turbine system, and wherein the control action comprises controlling the actuator.

9. A method, comprising:
during a gas turbine system operating under a load operating condition:
receiving at least one turbine operating condition of the gas turbine system, wherein the at least one turbine operating condition comprises an actual operating condition or a statistically derived estimate of a most likely operating condition during the load operating condition;
receiving a health status of at least one component of the gas turbine system;
modeling an operating life of the gas turbine system based on the at least one turbine operating condition and the health status of the at least one component;
calculating an actual life consumption rate for the gas turbine system based on the at least one turbine operating condition and the health status of the at least one component; and
outputting a control action based on at least the operating life of the gas turbine system for controlling the gas turbine system.

10. The method of claim 9 wherein modeling the operating life of the gas turbine system comprises utilizing a life consumption target rate for the gas turbine system and the actual life consumption rate to model the operating life of the gas turbine system.

11. The method of claim 10, wherein modeling the operating life of the gas turbine system comprises adjusting the life consumption target rate based on the actual life consumption rate.

12. The method of claim 9, adjusting at least one performance-targeted operating condition for the gas turbine system based on the operating life of the gas turbine system.

13. The method of claim 12, comprising deriving the control action based on the at least one adjusted performance-targeted operating condition and operational limits for the gas turbine system.

14. A non-transitory computer-readable medium having computer executable code stored thereon, the code comprising instructions for:
during a gas turbine system operating under a load operating condition:
receiving at least one turbine operating condition of the gas turbine system, wherein the at least one turbine operating condition comprises an actual operating condition or a statistically derived estimate of a most likely operating condition during the load operating condition;
receiving a health status of at least one component of the gas turbine system;
modeling an operating life of the gas turbine system based on the at least one turbine operating condition and the health status of the at least one component;
calculating an actual life consumption rate for the gas turbine system based on the at least one turbine operating condition and the health status of the at least one component; and
outputting a control action based on at least the operating life of the gas turbine system for controlling the gas turbine system.

15. The non-transitory computer-readable medium of claim 14, wherein the instructions for modeling the operating life of the gas turbine system comprises instructions for utilizing a life consumption target rate for the gas turbine system and the actual life consumption rate to model the operating life of the gas turbine system.

* * * * *